UNITED STATES PATENT OFFICE.

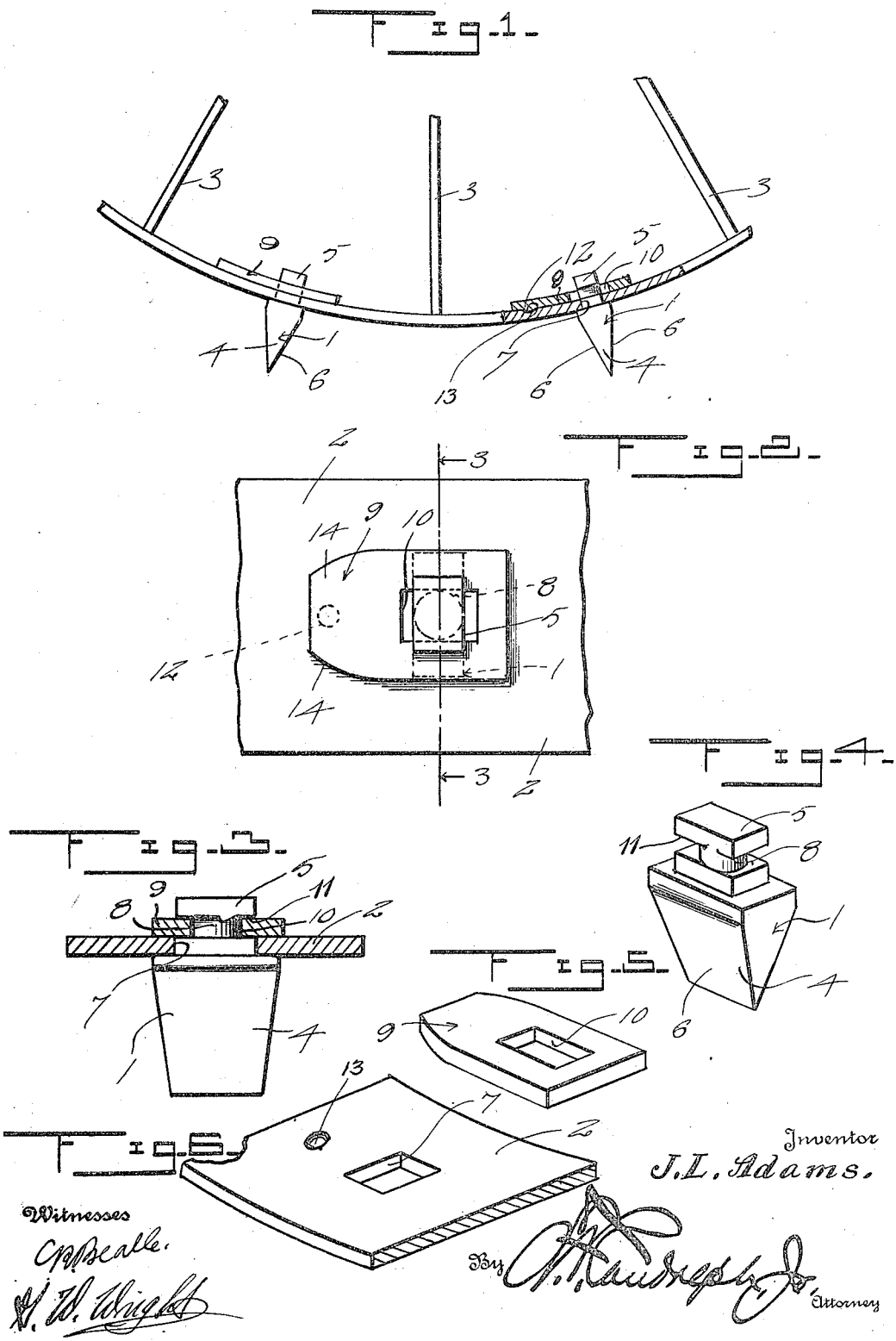

JOSIAH L. ADAMS, OF ROCK ISLAND, ILLINOIS.

LUG-FASTENER FOR TRACTION-WHEELS.

1,280,360.

Specification of Letters Patent.

Patented Oct. 1, 1918.

Application filed December 12, 1917. Serial No. 206,787.

*To all whom it may concern:*

Be it known that I, JOSIAH L. ADAMS, a citizen of the United States, residing at Rock Island, in the county of Rock Island and State of Illinois, have invented certain new and useful Improvements in Lug-Fasteners for Traction-Wheels; and I do hereby declare the following to be a full, clear, and exact description of the invention, such as will enable others skilled in the art to which it appertains to make and use the same.

This invention relates to lugs for traction wheels and the like and the primary object of the invention is to provide an improved means for attaching the lugs to the traction wheels, so that the same can be readily removed from or placed on the traction wheels.

A further object of the invention is to provide the improved lug with a rectangular head, which is adapted to extend through an opening of the same configuration formed in the rim of the traction wheel, and to have a locking plate for the lug, the locking plate having an opening therein of the same configuration as the head, and the head having a narrow rounded reduced neck portion forming shoulders on the head, so that the locking plate can be turned on the head for engaging said shoulders to prevent the removal of the lugs from the traction wheels.

A further object of the invention is to provide a lug fastener of the above character, which includes a locking plate for engaging the lug to prevent removal thereof, said locking plate having means for engaging the rim of the traction wheels, whereby accidental movement of the locking plate is eliminated.

A still further object of the invention is to provide a lug fastener of the above character, which is durable and efficient in use, one that is simple and easy to manufacture, and one that it can be placed upon the market at a reasonable cost.

With these and other objects in view, the invention consists in the novel construction, arrangement and formation of parts, as will be hereinafter more specifically described, claimed and illustrated in the accompanying drawing, forming a part thereof, in which:

Figure 1 is a fragmentary side elevation of the traction wheel showing the improved lugs attached thereto, portions of the traction wheel and the lug attaching means being shown in section.

Fig. 2 is a fragmentary plan view of the internal surface of a traction wheel rim, showing the improved lug in position and the locking means therefor.

Fig. 3 is a transverse section taken on the line 3—3 of Fig. 2.

Fig. 4 is a detail perspective view of the improved lug.

Fig. 5 is a detail perspective view of the improved locking plate, and

Fig. 6 is a perspective view of a fragment of the rim of the traction wheel showing the opening for receiving the head of the lug.

Referring to the drawing, in detail, wherein similar reference numerals designate corresponding parts throughout the several views, the numeral 1 generally indicates the improved lug, which is adapted to be attached to the rim 2 of an ordinary type of traction wheel 3.

The improved lug 1 includes the head or ground engaging portion 4, and the reduced upwardly extending polygonal shank 5. The head 4 has its opposite side surfaces inclined downwardly as at 6 to provide a sharp ground engaging cleat. The rim 2 of the wheel 3 is provided with polygonal opening 7, of the same configuration as the shank. The shank 5 is reduced intermediate its ends to the central portion thereof to provide a rounded reduced neck 8, for a purpose, which will hereinafter more fully appear.

A substantially flat rectangular locking plate 9 is provided for engaging the shank 5 and the inner surface of the rim 2 to prevent the removal of the lug 1, and the plate is provided with a polygonal opening 10, which is of the same size and configuration as the shank 5.

When the lug 1 is to be positioned on the rim 2 of the traction wheel 3 the reduced shank 5 is positioned through the opening 7 and the locking plate 9 is positioned on the upper surface of the rim 2 and the shank 5 is positioned through the opening 10, and the plate 9 is then turned on the reduced neck 8 until the polygonal opening 10 extends across the opening 7, and the side walls of the opening 10 will engage under the shoulders 11 formed on the shank 5 by means of the reduced neck portion 8. Thus the removal of the lug 1 is prevented.

The locking plate 9 is provided with a raised teat 12 on its lower surface adjacent one end thereof and this teat is adapted to engage in a recess 13 formed in the upper surface of a vehicle wheel rim 2 and in spaced relation to the opening 7 and when the locking plate is rotated on the rounded neck 8 of the shank 5 the teat 12 will engage in the recess 13 and prevent the accidental turning of the plate on the shank.

The side edges of the plate 9 adjacent the teat 12 are beveled as at 14 to provide a reduced end on the plate, whereby the same can be readily gripped and turn the same.

From the foregoing description it can be seen that an improved means for attaching the lugs to traction wheels is provided, which allows the lugs to be easily placed on or removed from the rim of the traction wheels.

While in the foregoing the fastener has been shown in connection with lugs of the character described it is to be understood that the same principle can be used for bolts shaped similar to the shank of the lugs and used for holding angle lugs or cleats in position, when the same are used.

In practice, I have found that the form of my invention, illustrated in the accompanying drawing and referred to in the above description, as the preferred embodiments, is the most efficient and practical; yet realizing the conditions concurrent with the adoption of my device will necessarily vary, I desire to emphasize the fact that various minor changes in details of construction, proportion and arrangement of parts may be resorted to, when required, without sacrificing any of the advantages of my invention as set forth.

What is claimed is:—

1. In a device of the class described, the combination, a vehicle rim having a polygonal opening therein, a lug detachably associated with the rim and including a reduced polygonal shank engaging in said opening, said shank having a narrow reduced neck portion at the central portion thereof, and a locking plate having a polygonal opening for receiving the shank, said plate being positioned for rotary movement on the reduced neck of the shank, as and for the purpose specified.

2. In a device of the class described, the combination, a vehicle rim having a polygonal opening therein, a lug detachably associated with the rim, and including a polygonal reduced shank engaging in said opening, said shank having a reduced narrow neck portion formed therein at the central portion thereof, a flat plate having a polygonal opening for receiving said shank, said plate being mounted for rotary movement on said reduced neck portion, and means carried by said plate for engaging said rim to prevent accidental movement of said plate, as and for the purpose specified.

In testimony whereof I affix my signature in presence of two witnesses.

JOSIAH L. ADAMS.

Witnesses:
J. F. McBRIDE,
F. B. STARRING.